(12) United States Patent
Robinson et al.

(10) Patent No.: US 7,494,284 B2
(45) Date of Patent: Feb. 24, 2009

(54) DEVICE FOR FURCATING FIBER OPTIC CABLES

(75) Inventors: Paul Robinson, Bainbridge Island, WA (US); Daniel Bagby, Enumclaw, WA (US); Terry Kleeberger, Tacoma, WA (US); Anthony Thostenson, Renton, WA (US); Bill Eliot, Redmond, WA (US); Douglas Harvey, Tukwila, WA (US)

(73) Assignee: Carlyle Inc., Tukwilla, WA (US)

( * ) Notice: Subject to any disclaimer, the term of this patent is extended or adjusted under 35 U.S.C. 154(b) by 0 days.

(21) Appl. No.: 11/838,683

(22) Filed: Aug. 14, 2007

(65) Prior Publication Data

US 2008/0138020 A1   Jun. 12, 2008

Related U.S. Application Data

(63) Continuation of application No. 11/474,110, filed on Jun. 23, 2006, now Pat. No. 7,270,485.

(51) Int. Cl.
*G02B 6/36* (2006.01)
(52) U.S. Cl. ......................................... 385/53; 385/106

(58) Field of Classification Search ................. 385/139, 385/136, 87, 86, 55, 137, 147, 53, 106
See application file for complete search history.

(56) References Cited

U.S. PATENT DOCUMENTS 4,884,862 A * 12/1989 Kofod ........................ 385/55
7,093,984 B2 * 8/2006 Cox ............................ 385/86

* cited by examiner

*Primary Examiner*—Ellen Kim
(74) *Attorney, Agent, or Firm*—Perkins Coie LLP

(57) ABSTRACT

A fiber optic cable assembly is provided. The cable assembly includes a housing, a plurality of furcation tubes, and a bundled cable. The housing has an opening at a first end and a plurality of channels at a second end. The furcation tubes are aligned with corresponding channels. One end of the bundled cable extends into an interior space of the housing through the opening. The bundled cable has a cable jacket and cable filaments. A first portion of the cable filaments extends beyond the end of the cable jacket in the interior space. A plurality of optic fibers is disposed in the bundled cable and the housing, and a molding compound is disposed around the furcation unit. Individual optic fibers are in individual furcation tubes and movable to slide longitudinally relative to the housing.

18 Claims, 12 Drawing Sheets

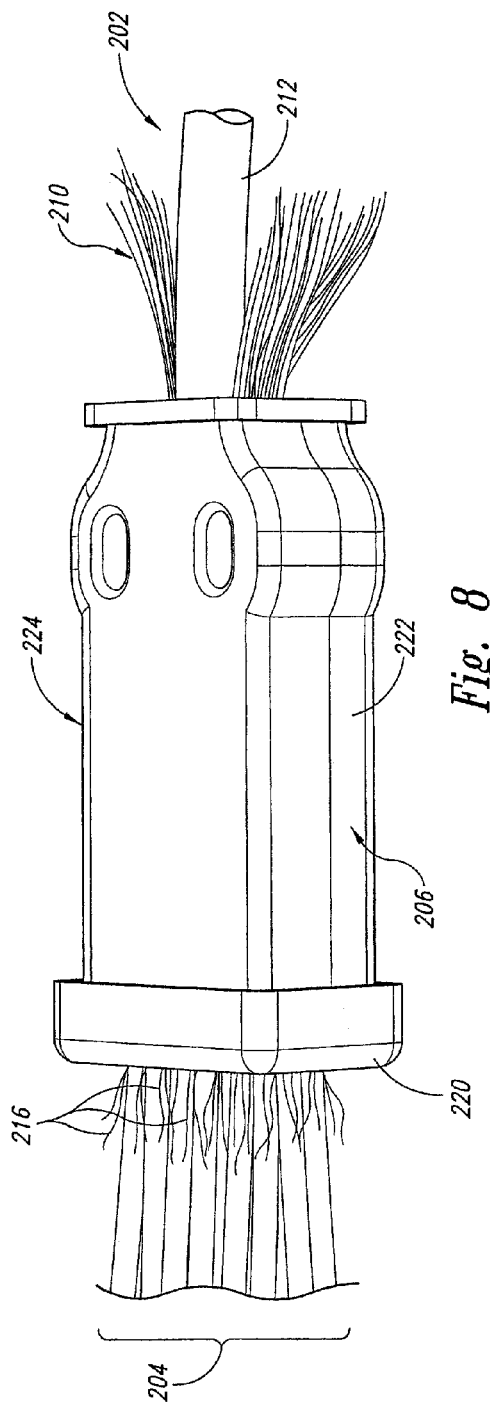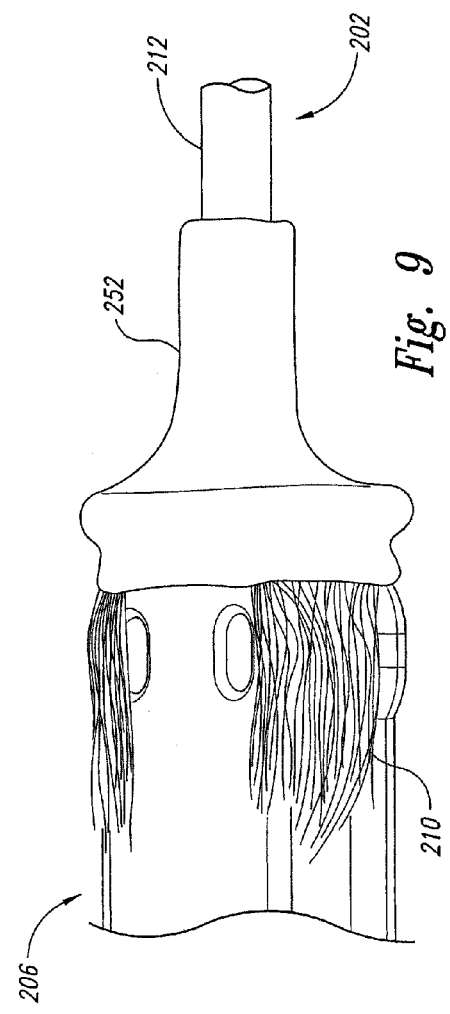

DEVICE FOR FURCATING FIBER OPTIC CABLES

CROSS-REFERENCE TO RELATED APPLICATION(S)

This is a continuation application of U.S. patent application Ser. No. 11/474,110, filed Jun. 23, 2006 now U.S. Pat. No. 7,270,485, entitled: DEVICE FOR FURCATING FIBER OPTIC CABLES, which is herein incorporated by reference in its entirety.

TECHNICAL FIELD

The present application relates to devices, assemblies, and methods for furcating fiber optic cables.

BACKGROUND

Fiber optic cables are frequently used for interconnecting computer systems (e.g., servers) because these cables can simultaneously carry a large amount of data without excessive transmission loss. A trunkline is a type of fiber optic cable that typically includes multiple optic fibers and strength filaments (e.g., Kevlar yarns) arranged lengthwise and encased in a protective jacket (e.g., plastic or metal tubing). At each end of the trunkline, the optic fibers are furcated into individual cables that terminate at individual connectors.

One conventional technique for furcating the trunkline uses heat-shrink tubing and epoxy. FIG. 1, for example, illustrates a prior art furcated cable 100 having a furcation unit 101 with a heat-shrink tube 102 encasing an epoxy 104, a trunkline 106 connected to one end of the furcation unit 101, and furcation tubes 112 projecting from the other end of the furcation unit 101. The trunkline 106 includes a cable jacket 113 encasing portions of optic fibers 108 and cable filaments 110. Each furcation tube 112 includes a tube jacket 116 encasing tube filaments 114 and one of the optic fibers 108. The heat-shrink tube 102 overlaps both the trunkline 106 and the furcation tubes 112 to enclose a portion of the optic fibers 108 and filaments 110, 114. The epoxy 104 rigidly binds the enclosed optic fibers 108 and filaments 110, 114 inside the heat-shrink tube 102. Each optic fiber 108 extends from the trunkline 106, through the epoxy 104, and out from the furcation tubes 112.

There are a number of drawbacks associated with the cable 100 described above. First, the furcation tubes 112 can occupy a considerable amount of space inside the heat-shrink tube 102 such that the heat-shrink tube 102 may not be able to accommodate a large number of furcation tubes. Furthermore, the optic fibers 108 can easily be damaged during installation, manufacturing, and other handling processes. For example, installing the furcated cable 100 typically includes pulling on the cable jacket 113 to draw the trunkline 106 through cable trays, conduits, and other channelways. The furcation unit 101 transmits the pulling force directly to the optic fibers 108 because the epoxy 104 rigidly binds the optic fibers 108 to the cable jacket 113. The transmitted force can damage the fragile optic fibers 108.

Another conventional technique for furcating the trunkline uses insertion-type connectors, such as the UniCam® MTP® connectors manufactured by Corning Cable Systems of Hickory, N.C. One drawback associated with this type of connectors is insertion loss. For example, a 10-gigabit system today typically has a transmission-loss budget of about 2.8 dB. An insertion-type connector typically incurs approximately 0.5 dB to 1.0 dB transmission loss at each junction. As a result, using three insertion-type connectors can potentially exceed the transmission loss budget.

BRIEF DESCRIPTION OF THE DRAWINGS

FIG. 8 is a partial isometric view of a furcation unit during a stage in an assembly process in accordance with another embodiment of the invention.

FIG. 9 is a partial isometric view of a furcation unit during a stage in an assembly process in accordance with another embodiment of the invention.

DETAILED DESCRIPTION

A. Overview

Figure 1:
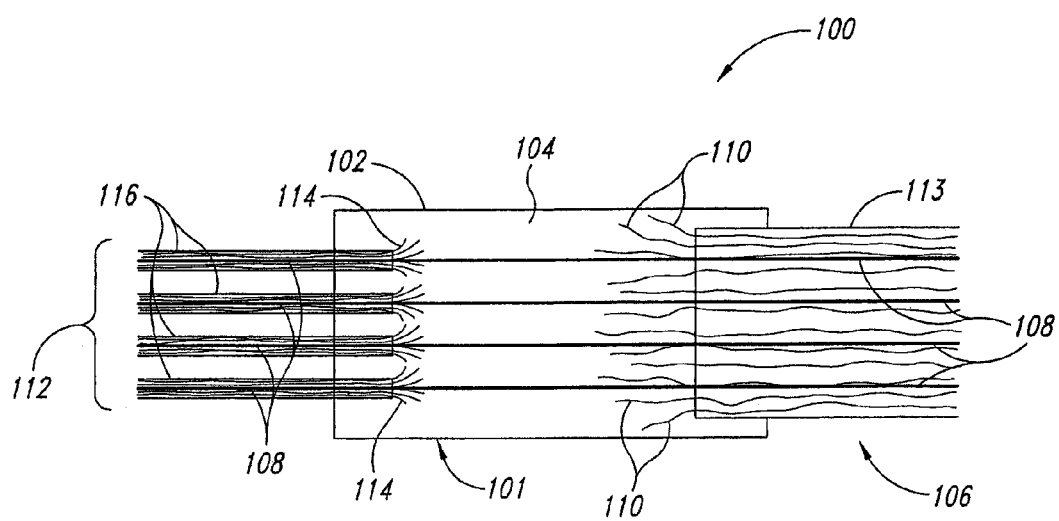
FIG. 1 is a cross-sectional view of a furcated cable in accordance with the prior art.

The present disclosure describes devices, assemblies, and methods for furcating a fiber optic cable. The term "fiber optic" means any strand capable of transmitting optic signals. Suitable fiber optic materials include optically transmissive glass or plastic threads. It will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the invention. Additionally, the invention can include other embodiments that are within the scope of the claims but are not described in detail with respect to FIGS. 2-10.

One aspect is directed toward a fiber optic cable assembly including a housing having a first end, a second end, and an interior space between the two ends. The housing has an opening at the first end and a plurality of channels at the second end. The fiber optic cable assembly also includes a plurality of furcation tubes aligned with corresponding channels and a bundled cable having cable filaments in a cable jacket. One end of the bundled cable extends into the interior space through the opening. The cable filaments include a first portion extending beyond the end of the cable jacket in the interior space and a second portion extending through the opening to be external to the housing and/or the cable jacket. The fiber optic cable assembly further includes a plurality of optic fibers movable to slide longitudinally relative to the bundled cable, the housing, and individual furcation tubes. A molding compound is positioned around the furcation unit.

Another aspect is directed toward a fiber optic cable assembly including a furcation unit having a head with a plurality of channels, a base having an opening and an anchor, and a cover coupled to the base and the head to define an interior space. The fiber optic cable assembly also includes a bundled cable having cable filaments inside a cable jacket. A portion of the cable filaments extend beyond the cable jacket, around the anchor, and out of the interior space via the opening. The fiber optic cable assembly further includes a plurality of furcation tubes corresponding to individual channels and a plurality of optic fibers slidably disposed in the bundled cable, the base, individual channels, and the furcation tubes.

Another aspect is directed toward a fiber optic cable assembly including a furcation unit having a first end, a second end, and an interior space. A bundled cable having a cable jacket and cable filaments is disposed at the first end of the furcation unit. A molding compound secures the cable filaments to the furcation unit. The fiber optic cable assembly also includes a plurality of optic fibers extending through the bundled cable and the furcation unit to project from the second end of the furcation unit. The optic fibers are slidably movable in a longitudinal direction relative to the furcation unit and the bundled cable.

A further aspect is directed toward a method of furcating a bundled cable into a plurality of furcation tubes. The bundled cable has a cable jacket enclosing a plurality of optic fibers and cable filaments. The method includes removing the cable jacket to partially expose the optic fibers and cable filaments, disposing each of the optic fibers inside one of the furcation tubes by extending the optic fibers from the bundled cable through the furcation unit, and engaging the cable jacket to the furcation unit by disposing the cable filaments proximate to an anchor inside the furcation unit.

B. Furcated Cable

Figure 2A:
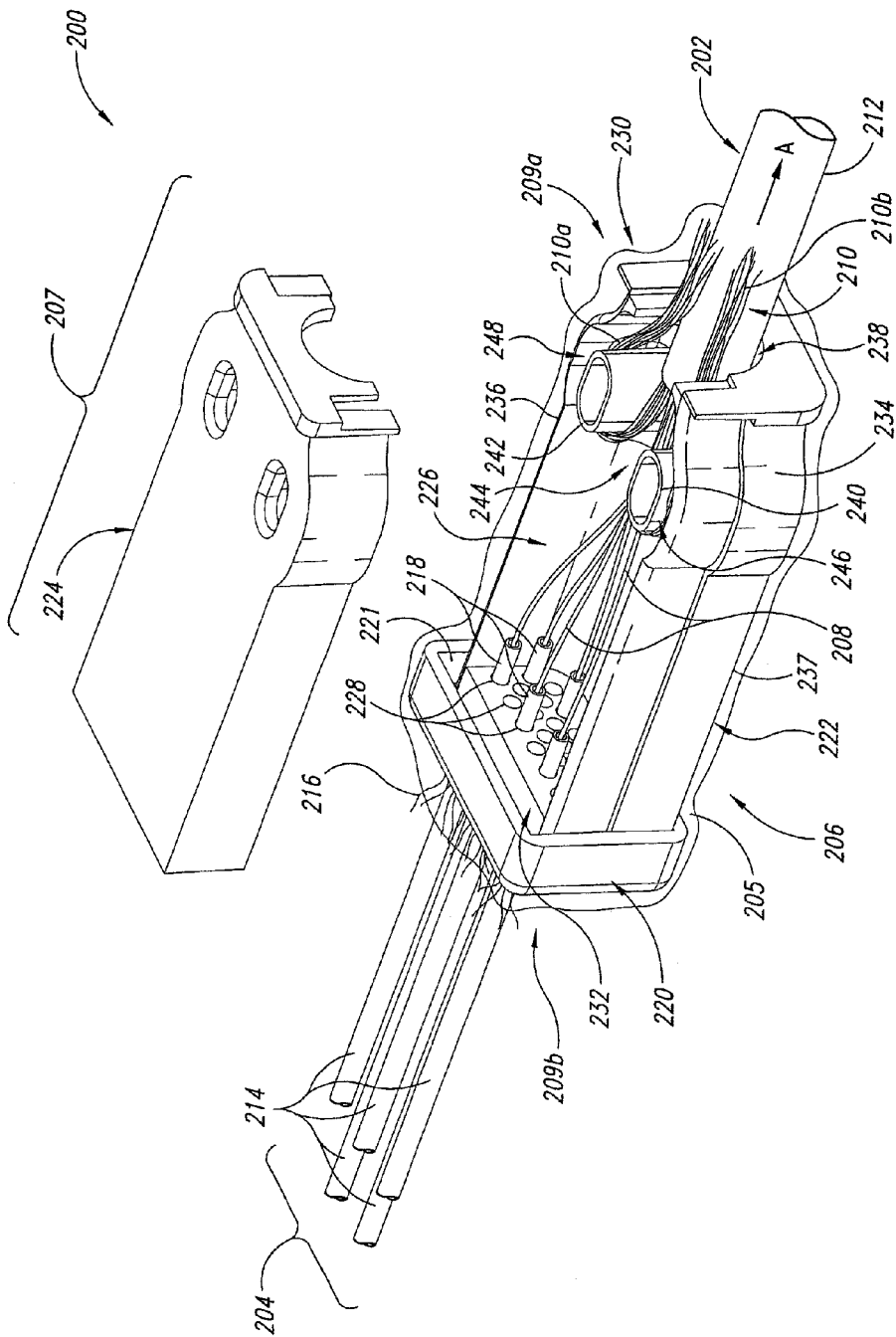
FIGS. 2A/2B are partially exploded isometric views of a furcated cable in accordance with several embodiments of the invention.
Figure 3:
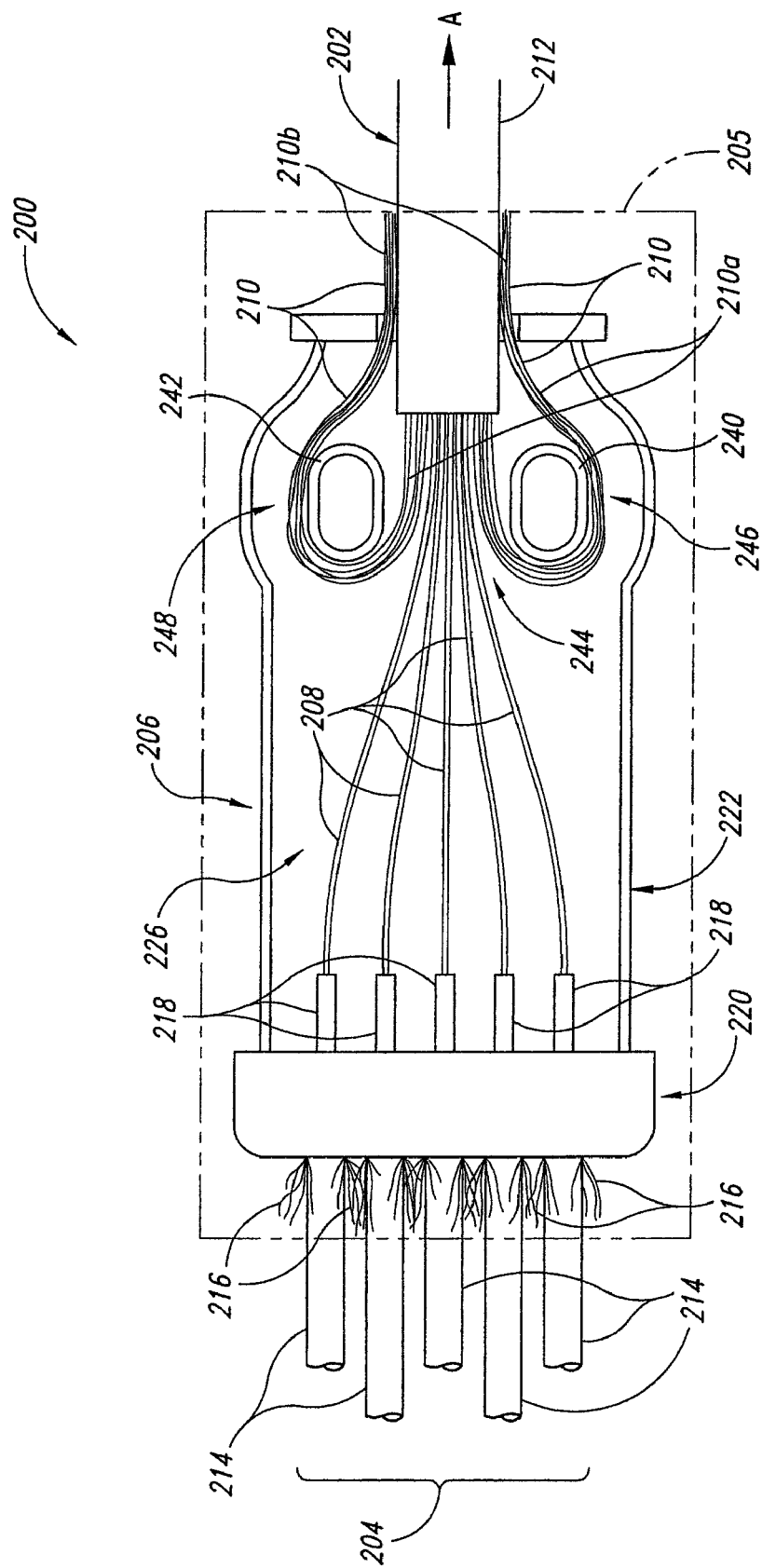
FIG. 3 is a top view of the furcated cable of FIG. 2 illustrating features of the furcated cable in more detail.

FIG. 2A is a partially exploded isometric view and FIG. 3 is a top view of a furcated cable 200 in accordance with an embodiment of the invention. The furcated cable 200 can include a bundled cable 202 (e.g., a trunkline), furcation tubes 204, and a furcation unit 206 in between the bundled cable 202 and the furcation tubes 204. The furcated cable 200 can further include a plurality of optic fibers 208 that are slidably disposed in the bundled cable 202, the furcation unit 206, and the furcation tubes 204 such that the optic fibers 208 can move in a longitudinal direction.

The bundled cable 202 can include a cable jacket 212 encasing cable filaments 210 and portions of the optic fibers 208. The optic fibers 208 and the cable filaments 210 can extend beyond one end of the cable jacket 212 proximate to the furcation unit 206. The cable jacket 212 can be constructed from plastic, metals, metal alloys, fiberglass, or other suitable materials. The cable filaments 210 can include strength fibers constructed from Kevlar, Nylon, polyester, or other suitable materials. The optic fibers 208 can include single-mode fibers, multi-mode fibers, index-graded fibers, or a combination of these types of optic fibers. The bundled cable 202 can optionally include other components including, for example, insulating layers (e.g., a plastic sheath), strengthening devices to support the cable jacket 212 (e.g., metal rings or plastic strips), and signal transmission devices (e.g., waveguides, repeaters, etc.).

Individual furcation tubes 204 can include a tube jacket 214, a buffer tube 218 slidably disposed inside the tube jacket 214, and tube filaments 216 between the tube jacket 214 and the buffer tubes 218. The tube filaments 216 at least partially surround a corresponding buffer tube 218. The buffer tube 218 and tube filaments 216 can also extend beyond one end of the tube jacket 214 proximate to the furcation unit 206. One optic fiber 208 is inside one buffer tube 218. The tube jackets 214 and buffer tubes 218 can be constructed from plastic, metals, metal alloys, fiberglass, or other suitable materials. The tube filaments 216 can include strength fibers constructed from Kevlar, nylon, polyester, or other suitable materials.

The furcation unit 206 can include a housing 207 or other enclosure having a head 220, a base 222, and a cover 224 that form an interior space 226. The housing 207 has a first end 209a proximate to the bundled cable 202 and a second end 209b proximate to the furcation tubes 204. The head 220 can be a generally rectangular structure having channels 228 configured to receive the buffer tubes 218, a slot 221 configured to receive the base 222 and/or the cover 224. The head 220 can be constructed from plastic (e.g., polycarbonate, polyurethane, etc.), metal, wood, or other suitable materials. In other embodiments, the head 220 can be circular or another shape. Various embodiments of the head 220 are described in more detail below with reference to FIGS. 4 and 5.

Figure 2B:
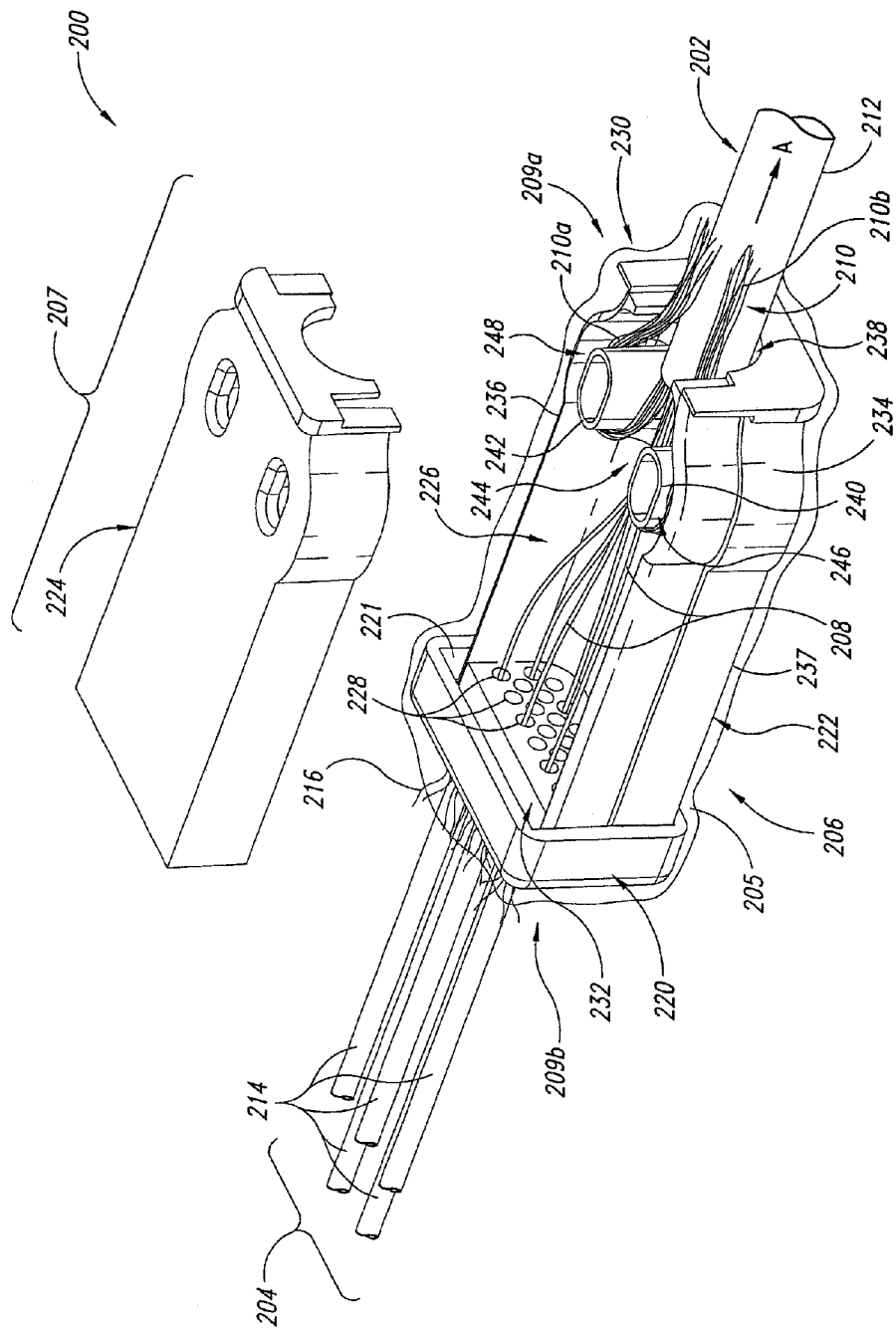

In the embodiment shown in FIGS. 2 and 3, the buffer tubes 218 extend through the channels 228 and into the interior space 226 of the housing 207. In another embodiment, the buffer tubes 218 can extend partially into the channels 228 but not into the interior space 226. In another embodiment, individual buffer tubes 218 can encase one of the optic fibers 208 and be slidably disposed in the bundled cable 202, the housing 207, and one of the furcation tubes 204. In a further embodiment, the buffer tubes 218 can be omitted, and the optic fibers 208 extend through the channels 228 to be disposed inside the tube jackets 214 as shown in FIG. 2B.

The cover 224 can include features (e.g., channels, notches, holes, etc.) to correspond to the base 222 and the head 220. The cover 224 can be constructed from plastic, metal, wood, or other suitable materials. In the embodiment shown in FIG. 2, the cover 224 cooperates with the base 222 to form an opening 238 for the cable jacket 212 at the first end 209a of the housing 207. In other embodiments, the base 222 or the cover 224 can include the opening 238.

The base 222 can include a first end 230 proximate to the bundled cable 202, a second end 232 proximate to the head 220, a first side wall 234, a second side wall 236, and a bottom wall 237 extending between the first and second ends 230, 232. The first end 230 can include the opening 238 for receiving the bundled cable 202. The second end 232 of the base 222 can be configured to correspond with the head 220. For example, the second end 232 of the base 222 can include features including, channels, notches, holes, etc., for interfacing with the head 220. The base 222 can be constructed from plastic, metal, wood, or other suitable materials.

In the embodiment shown in FIGS. 2 and 3, the opening 238 has a diameter larger than the outer diameter of the cable jacket 212. As a result, the bundled cable 202 can extend into the interior space 226 of the housing 207 through the opening 238. In another embodiment, the opening 238 can have a diameter slightly smaller than the outer diameter of the cable jacket 212 such that the second end 232 stops the cable jacket 212 from extending into the interior space 226 of the furcation unit 206.

The base 222 further includes a first anchor 240 and a second anchor 242 spaced apart from each other and near the first end 230. In one embodiment, the first and second anchors 240, 242 are formed integrally with the base 222. For example, in the embodiment shown in FIG. 2, the anchors 240, 242 are hollow columns with curved surfaces facing the second end 232. The anchors 240, 242 can extend from the bottom wall 237 of the base 222 and have oval-shaped channels. In other embodiments, the anchors 240, 242 can be solid structures fixedly attached to the bottom wall 237 of the base 222. For example, the first and second anchors 240, 242 can be generally cylindrical tubes fixedly attached to the bottom wall 237 of the base 222 using techniques including, for example, welding, friction fitting, mechanical fastening, etc.

The first and second anchors 240, 242 can define a primary channel 244 between the inner facing walls of the anchors 240, 242. The first anchor 240 and the first side wall 234 can define a first outer channel 246, and the second anchor 242 and the second side wall 236 can define a second outer channel 248. The optic fibers 208 extend through the primary channel 244 to the buffer tubes 218. The optic fibers 208 are not fixed to the bundled cable 202, the housing 207, or the buffer tubes 218, and thus the optic fibers 208 can slide longitudinally relative to these components. The cable filaments 210 can include a first portion 210a in the interior space and a second portion 210b external to the housing 207 and/or the cable jacket 212. The first portion 210a of the cable filaments 210 is positioned in the primary channel 244 and the first and second outer channels 246, 248 to wrap around the faces of the first and second anchors 240, 242 that face the second end 232. The second portion 210b of the cable filaments 210 extends through the opening 238 to be external to the housing 207 and/or the cable jacket 212. In other embodiments, the cable filaments 210 can be positioned in only one of the outer channels 246, 248.

The furcated cable 200 can further include at least one layer of molding (e.g., an epoxy 205) enclosing the furcation unit 206. The epoxy 205 can firmly attach the second portion 210b of the cable filaments 210 to the furcation unit 206 and/or the cable jacket 212. In one embodiment, appropriate molding pressure is applied such that the epoxy 205 does not penetrate into the interior space 226 of the furcation unit 206 via the channels 228 and/or the opening 238. As a result, the interior space 226 of the furcation unit 206 is substantially free of the epoxy 205 or any other adhesives such that the optic fibers 208 can slide longitudinally relative to the cable bundle 202 and the furcation unit 206. In another embodiment, the epoxy 205 can penetrate partially into the interior space 226 via the channels 218 and/or the opening 238 but not contact the optic fibers 208. In either embodiment, the optic fibers 208 can slide longitudinally in the interior space 226 of the furcation unit 206.

One expected advantage of several embodiments of the furcated cable 200 is the reduced risk of damaging the optic fibers 208 during handling processes because the furcation unit 206 can isolate tensile forces from the optic fibers 208. For example, when tension is applied to the cable jacket 212 during pulling (as indicated by arrow A), the epoxy 205 transmits the tension from the cable filaments 210 to the furcation unit 206 via the anchors 240, 242. The optic fibers 208, however, are not fixed to the furcation unit 206 and can slide longitudinally inside the housing 207 relative to the cable jacket 212, furcation tubes 204, and the furcation unit 206. As a result, the cable jacket 212 and the furcation unit 206 bear substantially all of the tensile forces applied to the cable jacket 212. Consequently, the risk of damaging the fragile optic fibers 208 can be reduced.

Another expected advantage of several embodiments is the ability to arrange a large number (e.g., 24) of furcation tubes in an organized fashion. In one embodiment, the channels 228 at the head 220 are organized into an array that has wiring designations (e.g., pin-out markings) to easily organize a large number of furcation tubes. Several embodiments of the furcation unit 206 can also reduce transmission loss through the furcated cable 200. Unlike in insertion-type connectors, the optic fibers 208 of the furcated cable 200 are continuous, i.e., not spliced in the furcation unit 206. As a result, the furcation unit 206 does not incur any appreciable insertion loss caused by splices.

The furcated cable 200 can have many additional embodiments with different and/or additional features without detracting from the operation of the furcated cable 200. For example, the head 220, the base 222, and/or the cover 224 of the furcation unit 206 can be formed as a unitary structure before assembly. In another example, the furcated cable 200 can include a heat-shrink tube covering the cable filaments 210 external to the cable jacket 212 before the epoxy 205 is applied. The furcated cable 200 can also include an adhesive between the furcation tubes 204 and the head 220 for additional structural integrity. In further embodiments, the furcated cable 200 can include fasteners including, for example, mechanical fasteners, compression fittings, etc., to assemble the furcation unit 206, the bundled cable 202, and the furcation tubes 204 into a furcated cable.

C. Furcation Unit

Figure 4:
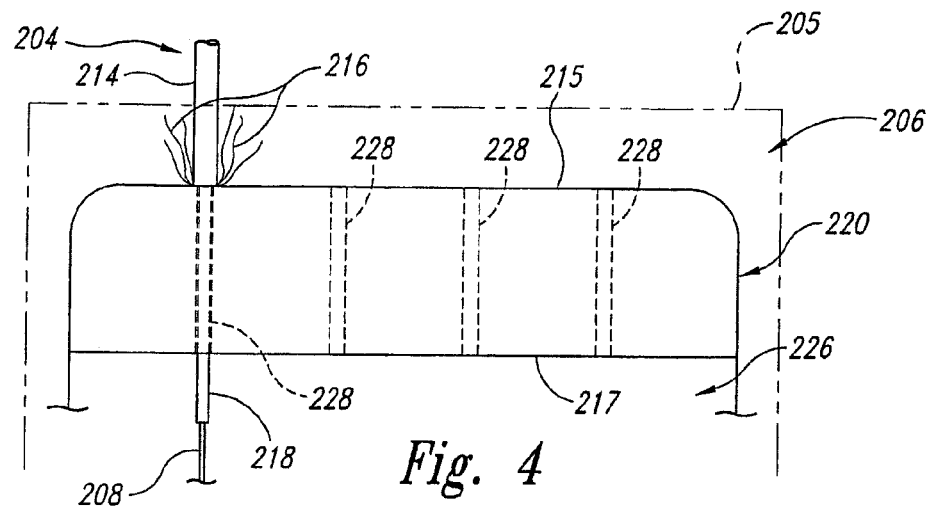
FIG. 4 is a partial top view of a portion of a furcation unit in accordance with an embodiment of the invention.

FIG. 4 is a partial top view of the furcation unit 206 of FIGS. 2 and 3 illustrating the head 220 in more detail. In the illustrated embodiment, only one furcation tube 204 is shown for clarity. The channels 228 can extend from a first face 215 to a second face 217 of the head 220. The channels 228 can have a diameter larger than the outer diameter of the buffer tube 218 but smaller than the inner diameter of the tube jacket 214. As a result, the buffer tubes 218 extend through the channels 228, but the tube jackets 214 and the tube filaments 216 butt up against the first face 215. The tube jacket 214 and the tube filaments 216, therefore, do not pass into the interior space 226. After assembly, the epoxy 205 can firmly attach the tube filaments 216 to the tube jacket 214 and/or the furcation unit 206.

Figure 5:
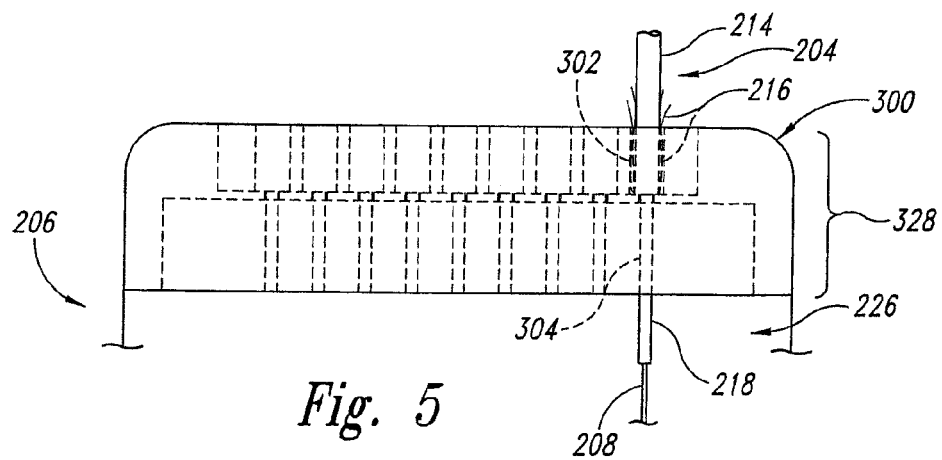
FIG. 5 is a partial top view of a portion of a furcation unit in accordance with another embodiment of the invention.

FIG. 5 is an alternative example of the furcation unit 206 of FIG. 4 in accordance with one embodiment of the invention. This alternative example and other alternatives described herein are substantially similar to previously described examples, and common acts and structures are identified by the same reference numbers. Only significant differences in operation and structure are described below. In this example, the furcation unit 206 includes a head 300 having first channels 302 and second channels 304. A first channel 302 corresponds to and is in communication with a second channel 304. The first channel 302 can have a diameter larger than the outer diameter of the tube jacket 214. The second channel 304 can have a diameter smaller than the inner diameter of the tube jacket 214 but larger than the outer diameter of the buffer tube 218. As a result, the tube jacket 214 and a portion of the tube filaments 216 can at least partially extend into the first channel 302 but not pass through the second channel 304. Instead, only the buffer tube 218 extends through the second channel 304 and into the interior space 226. In one embodiment, the head 300 includes an adhesive disposed in the first channels 302 to firmly engage the tube jacket 214 to the head 300. In another embodiment, the furcation tube 204 can engage the head 300 by friction, mechanical fastening, or other suitable means.

D. Assembly Process

Figure 6:
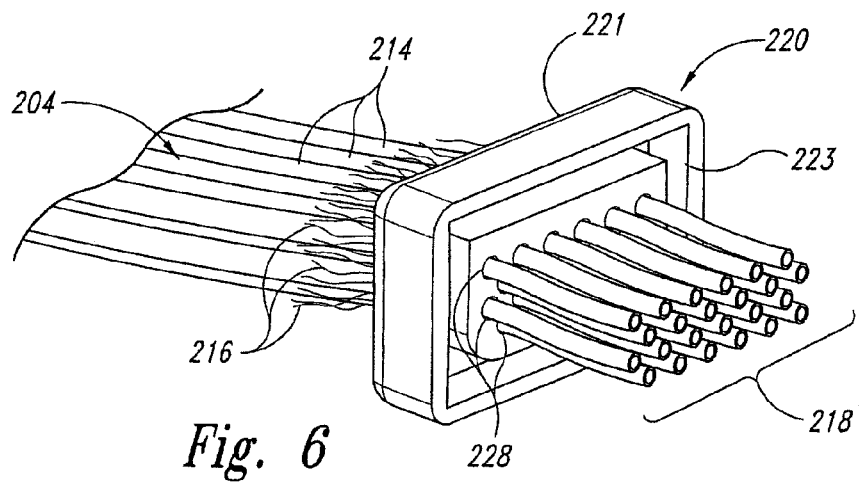
FIG. 6 is a partial isometric view of a furcation unit during a stage in an assembly process in accordance with another embodiment of the invention.

FIGS. 6-9 are partial isometric views of a furcation unit during stages in an assembly process in accordance with one embodiment of the invention. During assembly, a portion of the tube jacket 214 can be removed from each of the furcation tubes 204 to expose a desired length (e.g., two inches) of the buffer tube 218 and the tube filaments 216. The exposed buffer tube 218 can then be inserted through one of the channels 228 at the head 220 of the furcation unit 206. As illustrated in FIG. 6, each channel 228 receives one buffer tube 218 and prevents the exposed tube filaments 216 and the tube jackets 214 from extending through the channels 228.

Figure 7:
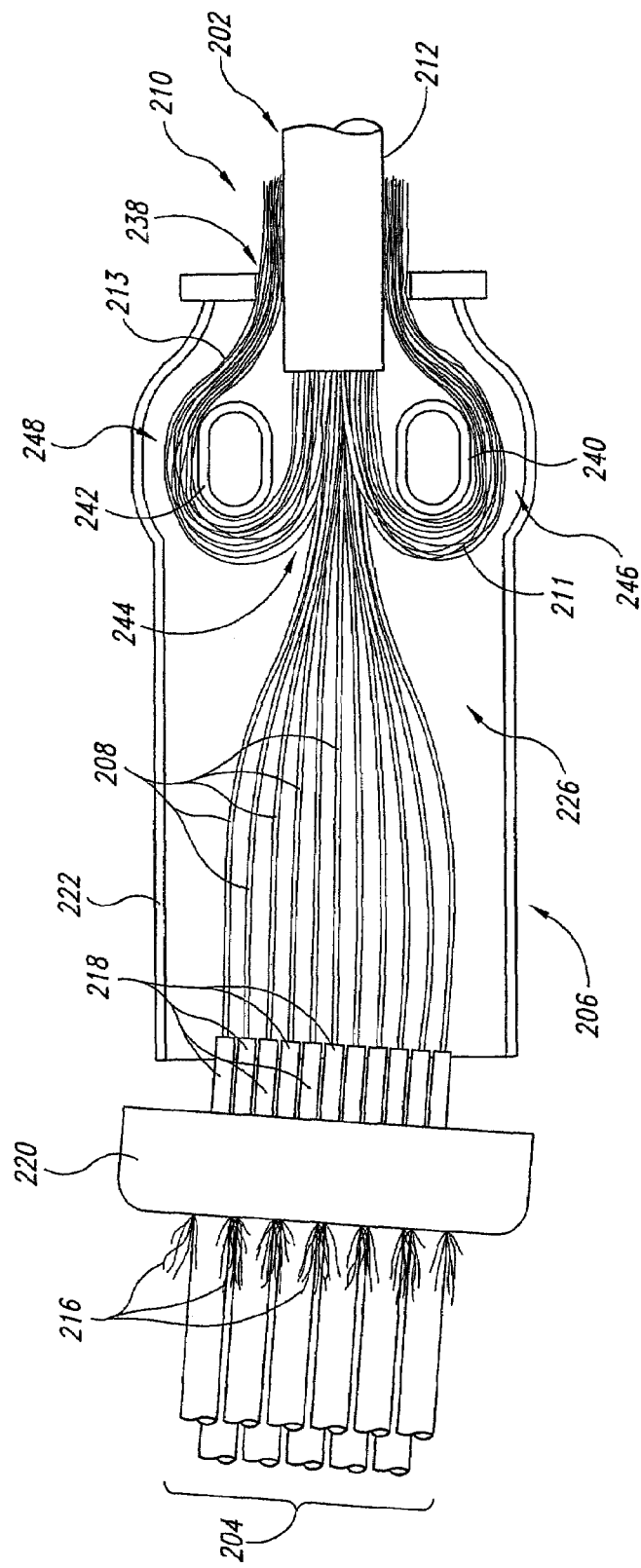
FIG. 7 is a partial isometric view of a furcation unit during a stage in an assembly process in accordance with another embodiment of the invention.

A portion of the cable jacket 212 can be removed to expose a desired length of the optic fibers 208 and the cable filaments 210. As illustrated in FIG. 7, each of the optic fibers 208 is inserted in one of the corresponding buffer tubes 218 extending from the head 220 via the primary channel 244 and the internal space 226 of the furcation unit 206. A first portion 211 of the exposed cable filaments 210 can be wrapped around the first anchor 240 and extended beyond the opening 238 to be external to the cable jacket 212. A second portion 213 of the exposed cable filaments 210 can be wrapped around the second anchor 242 and extended beyond the opening 238 to be external to the cable jacket 212. The cable filaments 210 external to the cable jacket 212 can be at least partially aligned with the bundled cable 202. Then the base 222 can be inserted into the head 220. The cover portion can then be combined with the head 220 and the base 222 to form the furcation unit 206 as illustrated in FIG. 8.

As illustrated in FIG. 9, in one embodiment, a heat-shrink tube 252 can be disposed at least partially over the furcation unit 206 and the bundled cable 202. The heat-shrink tube 252 can at least partially fasten the cable filaments 210 to the cable jacket 212 before heat molding. In the embodiment shown in FIG. 9, a portion of the cable filaments 210 extends from the heat-shrink tube 252 to cover a portion of the furcation unit 206. In other embodiments the heat-shrink tube 252 can substantially completely cover the cable filaments 210 external to the cable jacket 212. The epoxy 205 can then be disposed over the furcation unit 206 and at least a portion of the bundled cable 202 and the furcation tubes 204. In one embodiment, at least one layer of epoxy 205 can be disposed. In another embodiment, other means of assembly can be used including, for example, mechanical fasteners, compression fittings, etc.

Figure 10:
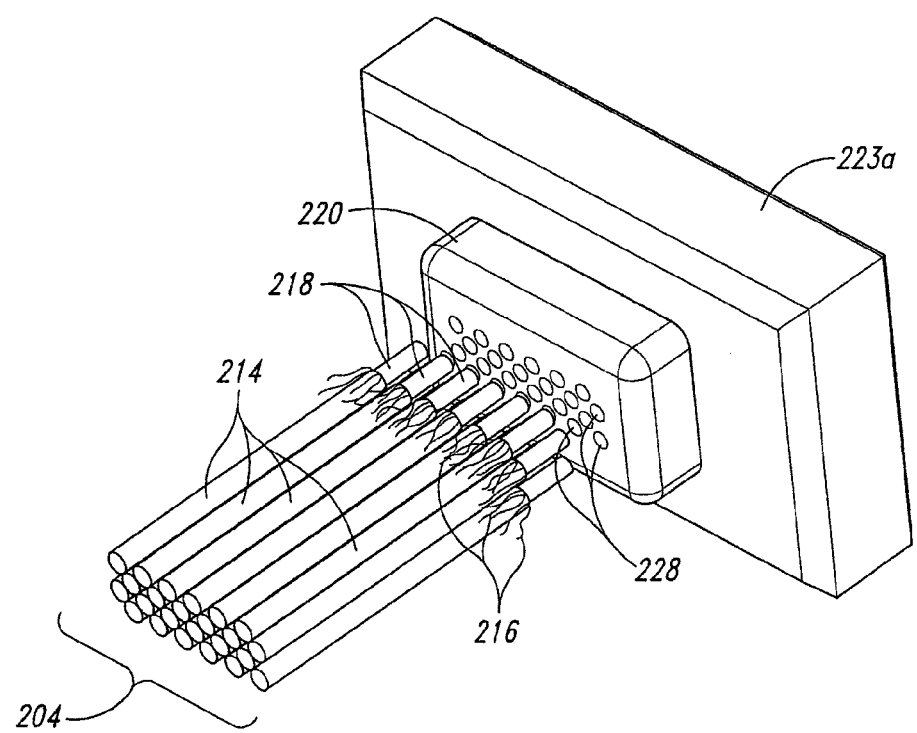
FIG. 10 is a partial isometric view of a furcation unit during a stage in an assembly process in accordance with another embodiment of the invention.

FIGS. 10-14 are partial isometric views of a furcation unit during stages in an alternative assembly process in accordance with another embodiment of the invention. During assembly, a first template 223a can be placed adjacent to the head 220. As illustrated in FIG. 10, the first template 223a is a generally rectangular block having apertures (not shown) corresponding to the channels 228 to allow the buffer tubes 218 to extend through. The first template 223a can be constructed from plastic, metal, wood, or any suitable material with sufficient rigidity. Then, the buffer tubes 218 can be partially exposed from the tube jackets 214 and inserted through the channels 228 at the head 220 of the furcation unit 206.

Figure 11:
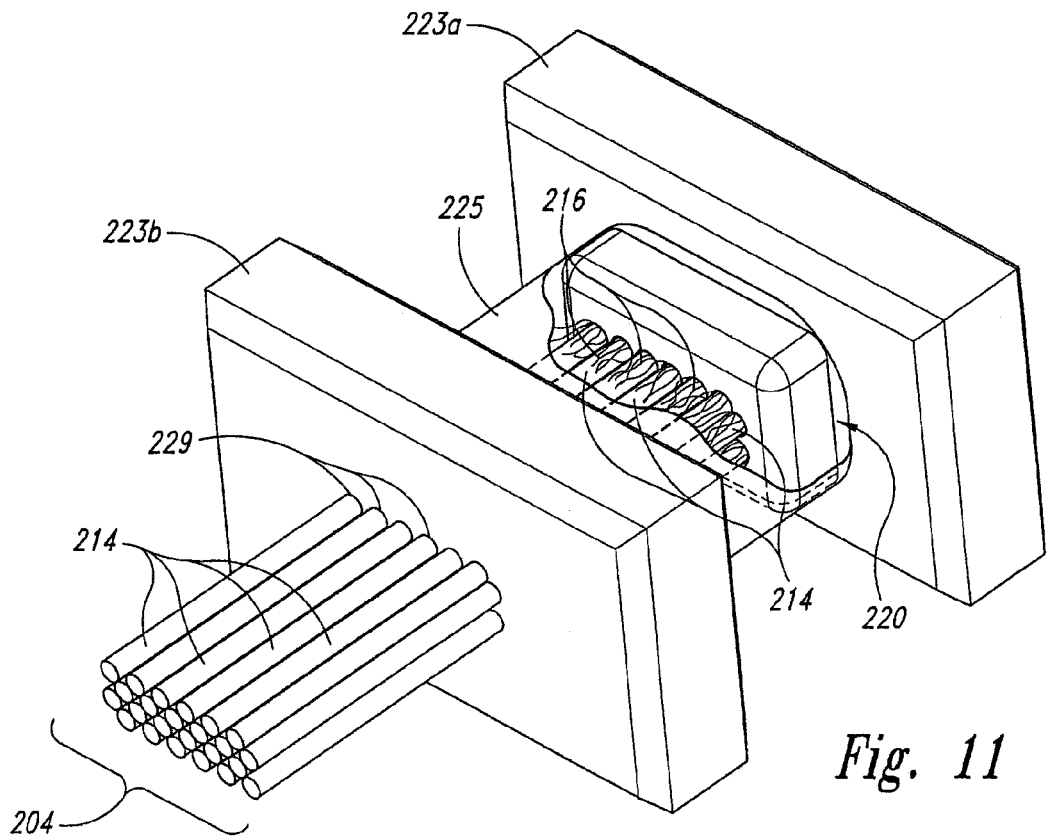
FIG. 11 is a partial isometric view of a furcation unit during a stage in an assembly process in accordance with another embodiment of the invention.
Figure 12:
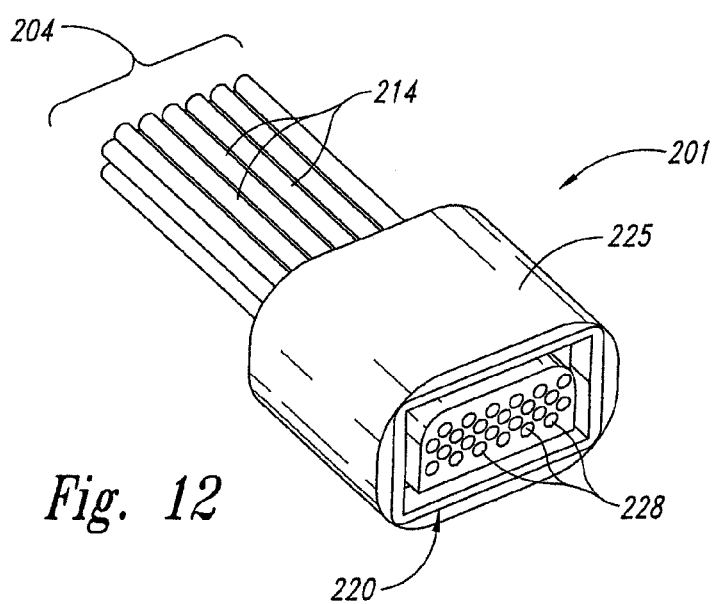
FIG. 12 is a partial isometric view of a furcation unit during a stage in an assembly process in accordance with another embodiment of the invention.

As illustrated in FIG. 11, a second template 223b similar to the first template 223a can then be placed spaced apart from the head 220. The second template 223b includes apertures 229 to allow the tube jackets 214 to extend through the second template 223b. A molding compound 225 (e.g., an epoxy) can be disposed between the first and second templates 223a-b to fasten the tube jackets 214 but not the buffer tubes 218 to the head 220. A portion of the molding compound 225 is removed for clarity. Then, the buffer tubes 218 are withdrawn from the tube jackets 214, and the first and second templates 223a-b are removed to form a subassembly 201 as illustrated in FIG. 12.

Figure 13:
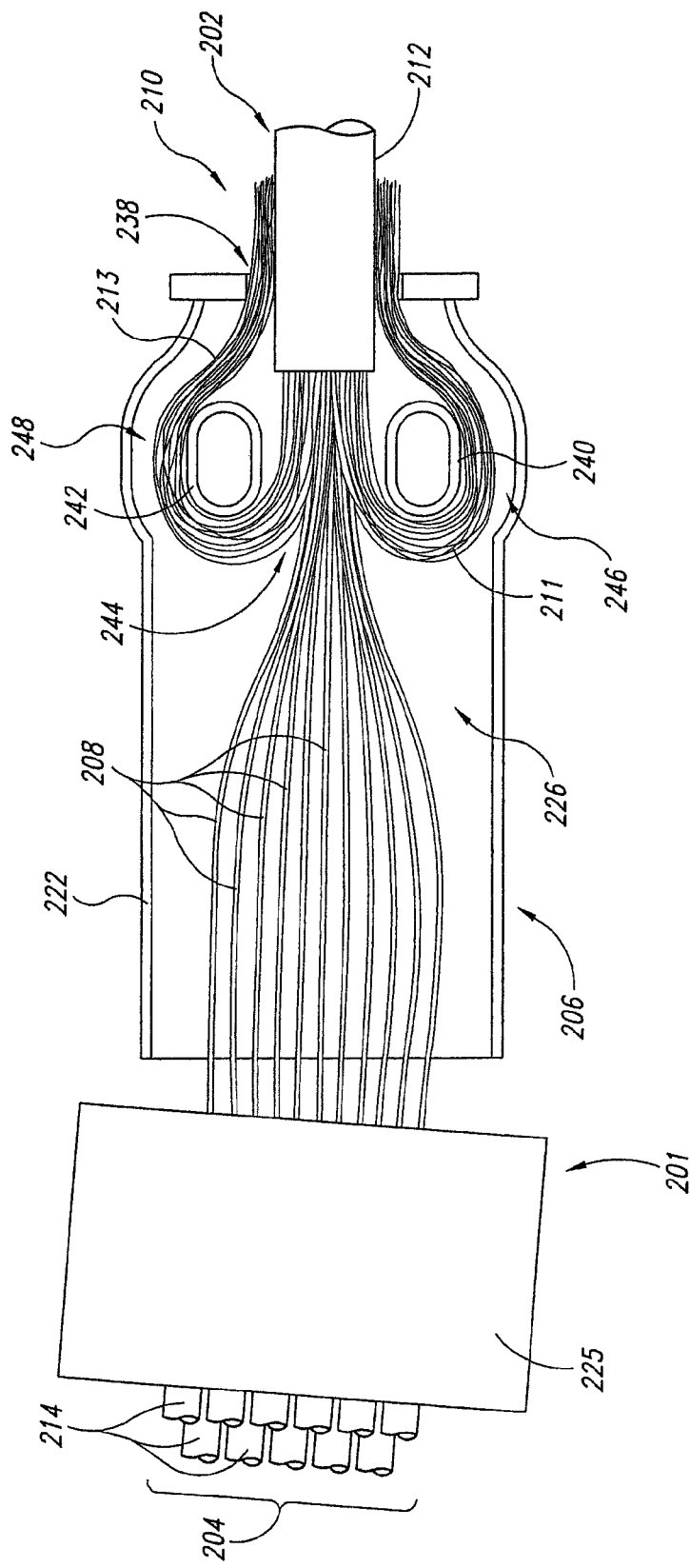
FIG. 13 is a partial isometric view of a furcation unit during a stage in an assembly process in accordance with another embodiment of the invention.
Figure 14:
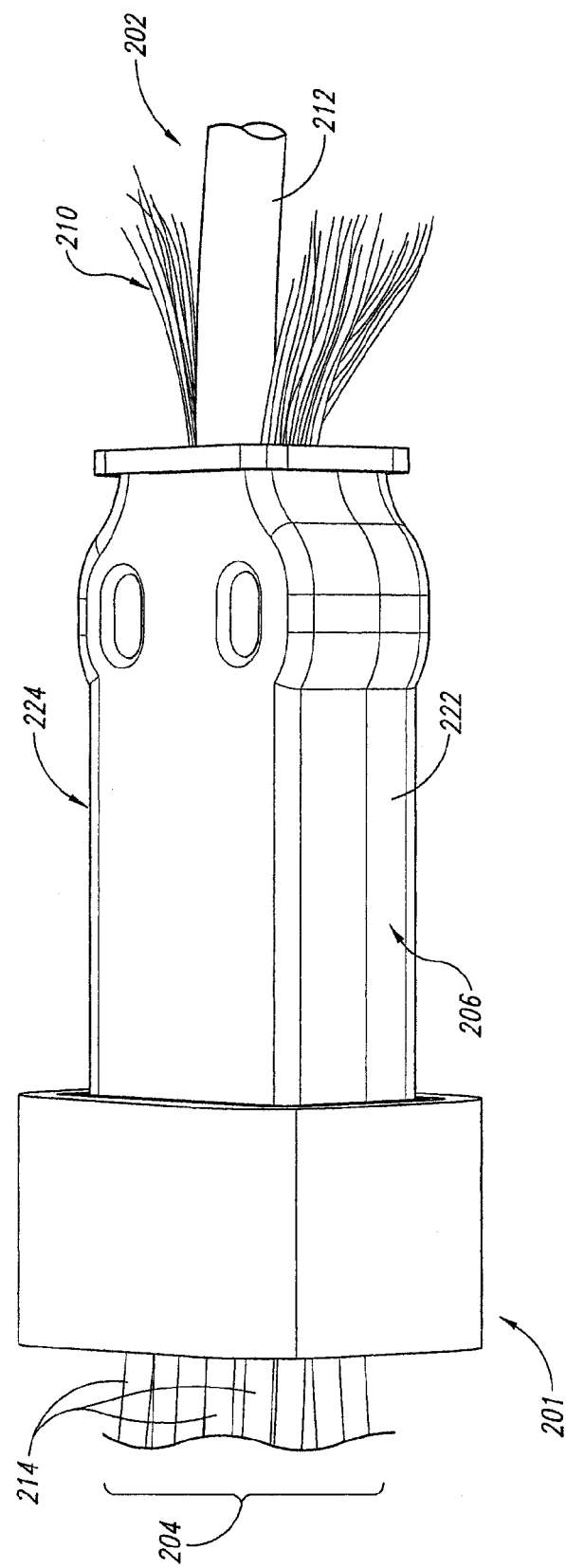
FIG. 14 is a partial isometric view of a furcation unit during a stage in an assembly process in accordance with another embodiment of the invention.

A portion of the cable jacket 212 can be removed to expose a desired length of the optic fibers 208 and the cable filaments 210. As illustrated in FIG. 13, each of the optic fibers 208 is inserted in one of the channels 228 via the primary channel 244 and the internal space 226 of the furcation unit 206. A first portion 211 of the exposed cable filaments 210 can be wrapped around the first anchor 240 and extended beyond the opening 238 to be external to the cable jacket 212. A second portion 213 of the exposed cable filaments 210 can be wrapped around the second anchor 242 and extended beyond the opening 238 to be external to the cable jacket 212. The cable filaments 210 external to the cable jacket 212 can be at least partially aligned with the bundled cable 202. Then the base 222 can be inserted into the subassembly 201. The cover portion can then be combined with the subassembly 201 and the base 222 to form the furcation unit 206 as illustrated in FIG. 14. Optionally, the heat-shrink tube 252 can be disposed at least partially over the furcation unit 206 and the bundled cable 202 as described above with reference to FIG. 9. Then, the epoxy 205 can then be disposed over the furcation unit 206, the subassembly 201, at least a portion of the bundled cable 202 and the furcation tubes 204.

E. Other Example of Furcation Unit

Figure 15:
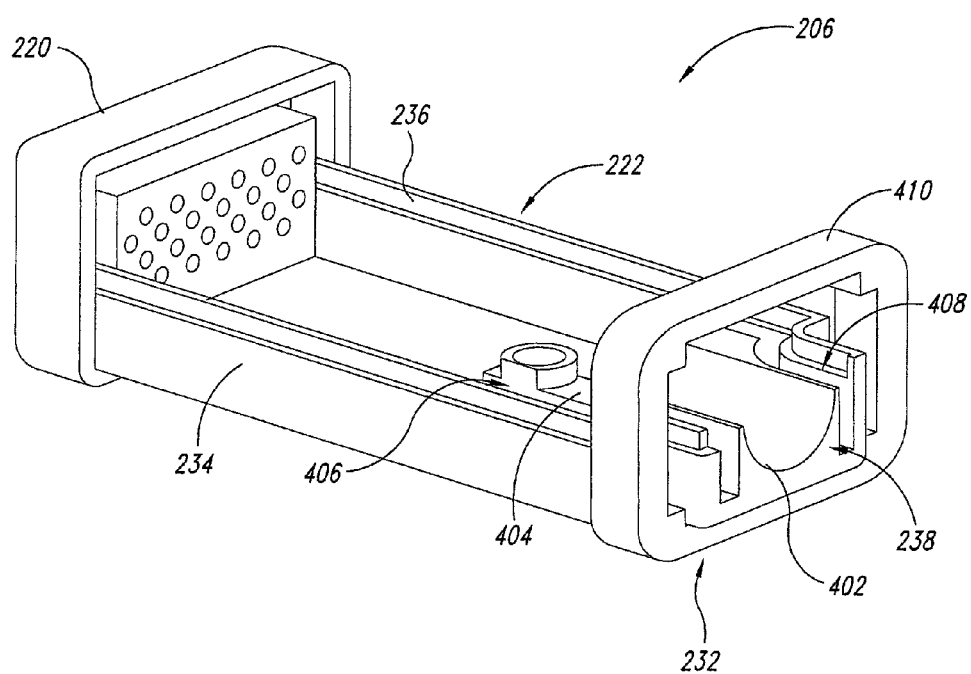
FIG. 15 is a partial isometric view of a furcation unit in accordance with a further embodiment of the invention.

FIG. 15 is an alternative example of the furcation unit 206 of FIG. 4 in accordance with another embodiment of the invention. In the illustrated embodiment, the cover 224 has been removed for clarity. In this example, the base 222 includes a cable seat 402 positioned proximate to the opening 238 and configured to support the bundled cable 202 (FIG. 2). The base 222 further includes an anchor 404 proximate to the opening 238. The anchor 404 can have a generally elongated shape and be spaced apart from the first side wall 234 to define a primary channel 406. The second side wall 236 and the cable seat 402 can define a secondary channel 408. During assembly, the cable filaments 210 can pass through the channels 406, 408 and extend beyond the opening 238 to be external to the furcation unit 206.

The furcation unit 206 can further include an end portion 410 opposite the head 220. The end portion 410 can be either releasably or fixedly attached to the base 222. The end portion 410 can be constructed from plastic, metals, metal alloys, fiberglass, or other suitable materials. In the illustrated embodiment, the end portion 410 includes a generally rectangular structure having a hollow center for receiving the second end 232 of the base 222. In other embodiments, the end portion 410 can include other shapes and/or configurations including, for example, a ring-shaped structure, a square-shaped structure, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

The above detailed descriptions of embodiments of the invention are not intended to be exhaustive or to limit the invention to the precise form disclosed above. Although specific embodiments of, and examples for, the invention are described above for illustrative purposes, various equivalent modifications are possible within the scope of the invention, as those skilled in the relevant art will recognize. For example, when steps are presented in a given order, alternative embodiments may perform steps in a different order. The various embodiments described herein can be combined to provide further embodiments.

In general, the terms used in the following claims should not be construed to limit the invention to the specific embodiments disclosed in the specification, unless the above detailed description explicitly defines such terms. Although certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

The invention claimed is:

1. A cable assembly, comprising:
   a housing having an opening at a first end and an interior space between the first end and a second end opposite the first end; and
   a bundled cable having an optic fiber, a cable filament, and a cable jacket at least partially around the optic fiber and the cable filament, an end of the cable jacket being proximate to the opening of the housing, wherein the cable filament and the optic fiber extend from the end of the cable jacket into the interior space of the housing, and wherein the optic fiber is longitudinally movable in the interior space relative to the housing, and further wherein the housing further includes an anchor extending from an internal surface of the housing, and wherein the cable filament wraps around at least a portion of the anchor and extends through the opening to be external to the housing.

2. The cable assembly of claim 1, wherein the cable assembly further comprises a fastener fastening the cable filament to the cable jacket.

3. The cable assembly of claim 1, wherein the cable assembly further comprises a molding compound fastening the cable filament to the cable jacket, wherein the interior space of the housing is substantially free of the molding compound.

4. A cable breakout assembly, comprising:
   a housing having a plurality of channels at a first end, an opening at a second end opposite the first end, and first and second side walls extending between the first and second ends; and
   an anchor positioned inside the housing and proximate to the second end, the anchor and the first side wall defining a first passage to the opening, and the anchor and the second side wall defining a second passage to the opening.

5. The cable breakout assembly of claim 4, wherein the anchor is either rigidly attached to the housing or integral with the housing.

6. The cable breakout assembly of claim 4, wherein the housing includes a bottom surface and a top surface between the first and second side walls, and wherein the anchor extends substantially from the bottom surface to the top surface.

7. The cable breakout assembly of claim 4, wherein the anchor is a first anchor, and wherein the cable breakout assembly further comprises a second anchor spaced apart from the first anchor in the interior space.

8. The cable breakout assembly of claim 4, wherein the anchor is a first anchor, and wherein the cable breakout assembly further comprises a second anchor spaced apart from the first anchor in the interior space, and wherein the first and second anchors define the second passage, and further wherein the second anchor and the second side wall define a third passage.

9. The cable breakout assembly of claim 8, wherein the first, second, and third passages are generally parallel with one another.

10. A cable assembly, comprising:
    a furcation unit having a plurality of channels at a first end and an opening at a second end opposite the first end, the furcation unit including an interior space between the first and second ends;
    an anchor positioned inside the furcation unit and proximate to the opening at the second end; and
    a bundled cable having a cable jacket and a plurality of optic fibers and cable filaments inside the cable jacket, the cable filaments extending from the cable jacket through the opening, around the anchor, and out of the interior space via the opening.

11. The cable assembly of claim 10, wherein the anchor is a first anchor, and wherein the cable assembly further comprises a second anchor spaced apart from the first anchor in the interior space.

12. The cable assembly of claim 11, wherein a first set of the cable filaments extends at least partially around the first anchor, and wherein a second set of the cable filaments extends at least partially around the second anchor.

13. The fiber optic cable assembly of claim 10, further comprising a fastener attaching the cable filaments to the cable jacket or the furcation unit.

14. The cable assembly of claim 10, further comprising a molding compound around the furcation unit, the cable filaments, and the cable jacket.

15. The cable assembly of claim 10, further comprising a molding compound around the furcation unit, the cable filaments, and the cable jacket, wherein the molding compound securing the cable filaments external to the furcation unit to the cable jacket.

16. The cable assembly of claim 10, further comprising a plurality of furcation tubes individually corresponding to the channels of the furcation unit.

17. The cable assembly of claim 10, further comprising a plurality of furcation tubes individually corresponding to the channels of the furcation unit, and wherein individual optic fibers extending from the cable jacket through the opening, via the interior space of the furcation unit, and into individual furcation tubes.

18. The cable assembly of claim 10, further comprising a plurality of furcation tubes individually corresponding to the channels of the furcation unit, and wherein the individual optic fibers extending from the cable jacket through the opening, via the interior space of the furcation unit, and into individual furcation tubes, and further wherein the individual optic fibers are slidably movable relative to the cable jacket of the bundled cable, the furcation unit, and the furcation tubes.

* * * * *